United States Patent [19]
Greene

[11] 3,904,588
[45] Sept. 9, 1975

[54] RANDOM ETHYLENE/ALKYL ACRYLATE 1,4-BUTENE-DIOIC ACID TERPOLYMERS

[75] Inventor: Robin N. Greene, Wilmington, Del.

[73] Assignee: E. I. Du Pont de Nemours and Company, Wilmington, Del.

[22] Filed: Aug. 9, 1973

[21] Appl. No.: 387,028

[52] U.S. Cl. ... 260/78.5 R; 260/78.5 E; 260/78.5 T; 260/80.81; 260/86.7
[51] Int. Cl.² .................. C08F 8/32; C08F 220/18
[58] Field of Search...... 260/78.5 R, 78.5 T, 78.5 E, 260/80.81, 86.7

[56] References Cited
UNITED STATES PATENTS

| | | | |
|---|---|---|---|
| 2,599,123 | 6/1952 | Pinkney et al. | 260/78.5 |
| 3,350,372 | 10/1967 | Anspon et al. | 260/86.7 |
| 3,474,076 | 10/1969 | Dalibor et al. | 260/78.5 |
| 3,502,745 | 3/1970 | Minton | 260/878 |

*Primary Examiner*—Joseph L. Schofer
*Assistant Examiner*—John Kight

[57] ABSTRACT

Random copolymers of ethylene, alkyl acrylate and 1,4-butene-dioic acid esters whose vulcanizates exhibit both low brittle point and low oil swell characteristics.

6 Claims, No Drawings

RANDOM ETHYLENE/ALKYL ACRYLATE 1,4-BUTENE-DIOIC ACID TERPOLYMERS

BACKGROUND OF THE INVENTION

A wide variety of industrial applications require vulcanized elastomeric articles which exhibit a combination of mechanical toughness, low brittle point, low oil swell, a high level of heat aging resistance, all at moderate cost. Heretofore, this particular combination of attributes has not been available in a single elastomeric material.

SUMMARY OF THE INVENTION

The instant invention provides random elastomeric copolymers having a particularly desirable resistance to oil and low temperatures that renders them suitable for a wide variety of industrial applications.

Specifically, the instant invention provides a random copolymer comprising ethylene, alkyl acrylate selected from methyl and ethyl acrylate, and about from 0.5 to 10 weight percent of a monoester of 1,4-butene-dioic acid in which the alkyl group of the ester has 1 to 6 carbon atoms. The copolymer has about from 20 to 35 grams of ($-CO_2-$) units per 100 grams of copolymer. The copolymer has a melt index of about 0.3 to about 100 grams/10 min., and preferably of 0.3 to 10 grams/10 min. The copolymer when vulcanized is elastomeric and has a brittle point of less than about $-40°C$. and an oil swell of less than about 120% after immersion in ASTM No. 3 oil for 70 hours at 150°C.

DETAILED DESCRIPTION OF THE INVENTION

The alkyl acrylate used in the preparation of the instant terpolymers can be selected from methyl acrylate and ethyl acrylate. Generally, methyl acrylate is preferred, and comprises about from 40 to 62 weight percent of the terpolymer, preferably 52–58 weight percent.

The monoalkyl ester of 1,4-butene-dioic acid functions as a cure-site monomer and comprises about from 0.5 to 10.0 weight percent of the terpolymer. 1,4-Butene-dioic acid exists in cis and trans forms, i.e., maleic and fumaric acid. Mono alkyl esters of either are satisfactory. Methyl hydrogen maleate, ethyl hydrogen maleate, and propyl hydrogen maleate are particularly satisfactory.

Ethylene is the third component of the terpolymer. Polymerized ethylene is present in the terpolymer in a complemental amount.

The terpolymers of this invention can be readily prepared by copolymerizing ethylene, an alkyl acrylate, and the mono alkyl ester cure-site monomer in the presence of a free-radical polymerization initiator. Free-radical polymerization initiators that can be used include peroxygen compounds such as lauryl peroxide, t-butyl peracetate, t-butylperoxypivalate, and di-t-butylperoxide, or an azo bis compound, such as azobisisobutyronitrile.

The quantities of alkyl acrylate and ester cure-site monomer are adjusted to provide the required amount of ($-CO_2-$) units in the final copolymer. The total ($-CO_2-$) units in the polymer is the sum of the ester groups in the acrylate monomer and in the 1,4-butene-dioic acid mono ester, and the acid groups in the mono ester. It has been found that when the grams of ($-CO_2-$) units per 100 grams of copolymer exceed 35, the brittle point of the copolymer is greater than the desired $-40°C$. Conversely, when less than 20 grams of ($-CO_2-$) units are present, the oil swell characteristics are depreciated.

Within the meaning of the present invention, the Brittle Point is measured by ASTM Method D-476-70 on peroxide press cured vulcanizates or amine press and post cured vulcanizates. The oil swell is measured on the same cured vulcanizates by ASTM Method D-471-68 (% volume swell in ASTM No. 3 oil after 70 hours at 150°C.).

The copolymerization can be carried out in a pressure reactor at moderately elevated temperatures, e.g., 90° to 250°C., preferably 145° to 155°C, and pressures of 1600 to 2200 atms., preferably 1800 to 2000 atms.

The polymerization is run as a continuous process, and ethylene, acrylate, ester cure-site monomer and optionally a solvent such as benzene are fed continuously into a stirred autoclave of the type disclosed in U.S. Pat. No. 2,897,183 to Christl et al. together with initiator. The rate of addition will depend on variables such as the polymerization temperature, pressure, monomers employed, and concentration of the monomers in the reaction mixture. In some cases it may be desirable to use a telogen such as propane, to control molecular weight. The reaction mixture is continuously removed from the autoclave. After the reaction mixture leaves the reaction vessel, the terpolymer is separated from the unreacted monomers and solvent, if solvent was used, by conventional means, e.g., vaporizing the unpolymerized materials and solvent under reduced pressure and at an elevated temperature.

If desired the polymer may be branched to modify its processing characteristics by including a minor amount of ethylene glycol dimethacrylate in the charge to the reactor.

After the continuous operation has reached a steady state, the total conversion of monomers to polymer varies from 5 to 12 weight percent. The melt index (M.I.) of a polymer is well recognized as being related to its molecular weight, the lower the M.I. the higher the molecular weight. The M.I. values are determined at 190°C as described in tentative ASTM test method D 1238-52T (ASTM Standards, 1955, Part 6, pages 292–295), and these varied from about 0.3 to 100 g/10 min. or more depending on polymerization conditions or the use of a telogenic additive. The percent by weight incorporation of the ester cure-site monomer can be measured by potentiometric titration with aqueous sodium hydroxide of a solution of the polymer in tetrahydrofuran.

The weight percent acrylate is determined by proton nuclear magnetic resonance and/or oxygen analysis after correcting for the amount of mono ester present. From these, the grams of carboxyl unit content per gram of copolymer can be determined by routine calculation.

The vulcanizates of terpolymers of the instant invention exhibit an oil swell of less than 120%, a brittle point of less than $-40°C$., and excellent heat aging resistance. These desirable properties permit the use of the instant terpolymers in automobile engine and heavy industrial equipment applications where good resistance to oil and low and high temperatures are required.

In contrast to the ethylene/alkyl acrylate copolymers of the prior art the instant copolymers exhibit significantly lower brittle points for a given level of acrylate monomer incorporated in the polymer composition; consequently, the instant copolymer compositions offer a markedly superior combination of oil resistance and low temperature performance.

Vulcanizates of the elastomeric copolymers of the instant invention can be used in a wide variety of industrial applications, including ignition wire jacketing, spark plug boots, hose, belts, miscellaneous molded boots, seals, and gaskets. The good low and high temperature physical properties and excellent oil resistance make these elastomers particularly well suited for automotive applications.

The present elastomeric compositions can be cured and compounded according to the following procedures. The compositions of the present invention can be vulcanized in the presence of peroxide curing systems composed of a peroxide and optionally a coagent. The peroxides used should be those that decompose rapidly within the range of 150° to 250°C. These include, for example, dicumyl peroxide, 2,5-bis(t-butylperoxy)-2,5-dimethylhexane, and α,α-bis(t-butylperoxy)-diisopropylbenzene. In a typical vulcanizate composition there will be about 0.5–5 parts by weight of peroxide per 100 parts of polymeric blend. The peroxide may be adsorbed on an inert carrier such as calcium carbonate, carbon black or Kieselguhr; however, the weight of the carrier is not included in the above range.

The coagent can be, for example, N,N'-(m-phenylene)-dimaleamide, trimethylolpropane trimethacrylate, tetraallyloxyethane, triallyl cyanurate, tetramethylene diacrylate, or polyethylene oxide glycol dimethacrylate. The amount of the coagent is about 0–5 parts by weight per 100 parts of polymeric blend, about 1–3 parts per 100 being preferred.

The coagents usually contain multiple unsaturated groups such as allyl or acrylic esters. While their mode of action is not known with certainty, it is believed that they react with the initial radical formed on the polymer backbone to form a more stable radical, which undergoes coupling reactions to form crosslinks more readily than chain scission reactions.

Other vulcanizing agents that can be used with the instant copolymers include amine curing systems, such as hexamethylenediamine, hexamethylenediamine carbamate, tetramethylenepentamine, hexamethylenediaminecinnamaldehyde adduct, as well as hexamethylenediaminedibenzoate salt. Aromatic amines can also be used as curing agents.

The vulcanizates of the present invention may also contain an antioxidant system based on a phosphorus ester antioxidant, a hindered phenolic antioxidant, an amine antioxidant, or a mixture of two or more of these compounds. The phosphorus ester compound can be, for example:

tri(mixed mono- and dinonylphenyl) phosphite,
tris(3,5-di-t-butyl-4-hydroxyphenyl) phosphate,
high molecular weight poly(phenolic phosphonates), and
6-(3,5-di-t-butyl-4-hydroxy)benzyl-6H-dibenz-[c,e][1,2]oxaphosphorin-6-oxide.

The hindered phenolic compounds include, for example, the following:

4,4-butylidenebis(6-t-butyl-m-cresol),
1,3,5-trimethyl-2,4,6-tris-(3,5-di-t-butyl-4-hydroxybenzyl)benzene,
2,6-di-t-butyl-α-dimethylamino-p-cresol, and
4,4'-thiobis-(3-methyl-6-t-butylphenol).

Suitable amine antioxidants include, among others, the following: polymerized 2,2,4-trimethyl-1,2-dehydroquinoline; N-phenyl-N'-(p-toluenesulfonyl)-p-phenylenediamine; N,N'-di(β-naphthyl)-p-phenylenediamine; low temperature reaction product of phenyl (β-naphthyl)amine and acetone; and 4,4'-bis(α,α-dimethylbenzyl)diphenylamine.

The proportion of the antioxidant compound in the vulcanizing composition is 0.1–5 parts per 100 parts of polymer, the preferred proportion being 0.5–2.5.

The antioxidant improves the heat aging of the compositions. The antioxidant effect is usually quite low below the preferred range and impractically low below the broad range recited above. Above the higher limits, little additional improvement is observed, and there may be adverse effects on the state of cure. The weight ratio of the phenolic or amine antioxidant to the phosphorus compound in the mixtures is about 0.5–3, the preferred ratio being about 1.

The preferred antioxidant compositions contain tri(-mixed mono and dinonylphenyl) phosphite in mixture with either 4,4'-bis(α,α-dimethylbenzyl)diphenylamine or 4,4'-butylidenebis(6-t-butyl-m-cresol).

It is often desirable to add fillers to reduce cost and to improve mechanical properties. A typical vulcanized composition will usually contain about 15–40 volume percent of fillers, for example, carbon black, barium sulfate, magnesium silicate, or silica. Other conventional fillers can also be used. The preferred proportion of the fillers is 20–25 volume percent, and also depends on the reinforcing effect of the individual fillers. Below the lower limit, the improvement of tensile properties is quite low; while above the upper limit, the heat aging resistance of the polymer is adversely affected.

The present invention is further illustrated by the following specific examples.

EXAMPLES 1–5

In examples 1–5 mixtures of ethylene, an alkyl acrylate, and a monoalkyl ester of maleic acid were copolymerized in the presence of a free-radical polymerization initiator and in a pressure reactor at 125°–175°C. and a pressure of 1700–1900 atm. The alkyl acrylate used was methyl-, or ethylacrylate containing 530–1200 ppm of a stabilizer, the monomethyl ether of hydroquinone. The monoalkyl ester of maleic acid contained less than 3 weight percent maleic acid and less than 2 weight percent maleic anhydride. The free-radical polymerization initiator used was t-butylperoxypivalate.

The polymerization was run as a continuous process, and ethylene, acrylate, monoalkyl ester of maleic acid, and benzene solvent were fed continuously into a 325 or 720 cc stirred autoclave at rates of 7–18 lbs/hr, 0.4–1.5 lbs/hr, 0.02–0.06 lbs/hr, and 1.1–2.5 lbs/hr, respectively. Initiator was introduced continuously at a rate of about 1.0–5.5 lbs/1000 lbs of polymer. The reaction mixture was continuously removed from the autoclave and was stripped of unpolymerized monomers and solvent under reduced pressure and at elevated temperature.

The melt indexes of the resulting polymers were determined at 190°C. as described in tentative ASTM test method D 1238-52T (ASTM Standards, 1955, Part 6, pages 292–295). The percent by weight incorporation of the monoalkyl ester of maleic acid was measured by potentiometric titration with aqueous sodium hydroxide of a solution of the polymer in tetrahydrofuran. The weight percent of alkyl acrylate is determined by proton nuclear magnetic resonance and/or oxygen analysis after correcting for the amount of monoalkyl maleate present. The various physical properties are summarized in Table I. In the Control Example, the quantity of (—$CO_2$—) units in the copolymer is below that required for the present invention.

The copolymers were then vulcanized by the following procedure. On a 2-roll rubber mill at about 25°C. were mixed 100 parts of terpolymer, 50 parts of Fast Extruding Furnace (FEF) carbon black, 1.5 parts of hexamethylenediamine carbamate (HMDAC), antioxidants and other additives as indicated in Table II. The compositions were sheeted off the mill and specimens for physical testing were prepared. Vulcanizate slabs 0.075 in. thick were prepared by press-curing for 30 minutes at 180°C. at about a total pressure of 40,000 lbs. Modulus, tensile strength, and elongation values were obtained at room temperature by ASTM Method D-412-66 on press-cured samples. Percent volume swell after immersion in ASTM No. 3 oil for 70 hrs. at 150°C. was determined according to ASTM D-471-68 on press-cured and post-cured (24 hours at 150°C. in an air atmosphere) samples. The brittleness temperature (Brittle Point) was determined according to ASTM D-746-70.

Examples 1-5 are within the scope of the application and have oil swell <120% and a brittle point <−40°C. The Control Example has oil swell >120%.

TABLE I

| Example | POLYMER PROCESS PARAMETERS AND POLYMER COMPOSITION | | | | | |
|---|---|---|---|---|---|---|
| | 1 | 2 | 3 | 4 | 5 | Control |
| Ethylene, Rate (pph) | 14.0 | 14.0 | 17.5 | 7.0 | 7.0 | 7.0 |
| Acrylate | Methyl Acrylate → | | | EA[1] | Methyl Acrylate | |
| Acrylate Rate (pph) | 1.37 | 1.39 | 1.50 | 0.95 | 1.22 | 0.40 |
| Termonomer | Ethyl Hydrogen Maleate → | | | | | |
| Termonomer Rate (pph) | 0.04 | 0.06 | 0.054 | 0.038 | 0.05 | 0.02 |
| Stabilizer (ppm)[2] | 600 | 600 | 1200 | 600 | 600 | 530 |
| Benzene Rate (pph) | 2.0 | 2.5 | 1.6 | 1.6 | 2.5 | 1.11 |
| t-Butylperoxypivalate[3] | 4.6 | 5.2 | 5.0 | 3.0 | 5.9 | 1.17 |
| Temperature (°C.) | 150 | 150 | 149 | 128 | 154 | 171 |
| Pressure (atm.) | 1830 | 1830 | 1830 | 1735 | 1870 | 1830 |
| % Conversion | 8.5 | 8.6 | 5.9 | 8.3 | 8.7 | 7.2 |
| Product | | | | | | |
| Melt Index | 0.9 | 1.2 | 2.2 | 39.0 | 32.5 | 1.9 |
| Wt. % Ethylene | 45.8 | 44.7 | 38.7 | 31.0 | 32.8 | 62.6 |
| Wt. % Acrylate | 51.2 | 51.3 | 55.4 | 64.2 | 61.6 | 35.8 |
| Wt. % Termonomer | 3.0 | 4.0 | 5.9 | 4.8 | 5.6 | 1.6 |
| gm (—$CO_2$—) Units/ 100 gm polymer | 28.0 | 28.7 | 31.9 | 31.2 | 35.0 | 19.3 |

Footnotes
[1] Ethyl Acrylate
[2] Monomethyl Ether of Hydroquinone
[3] Lb./1000 lb. Polymer

TABLE II

| Example | VULCANIZATE COMPOSITION AND PROPERTIES | | | | | |
|---|---|---|---|---|---|---|
| | 1 | 2 | 3 | 4 | 5 | Control |
| Composition (in parts) | | | | | | |
| Polymer | 100 | 100 | 100 | 100 | 100 | 100 |
| FEF Black | 50 | 50 | 50 | 50 | 50 | 50 |
| Hexamethylene Diamine Carbamate | 1.5 | 1.5 | 1.5 | 1.5 | 1.5 | 1.5 |
| 4,4'-Butylidenebis(6-t-butyl-m-cresol) | 1.0 | — | — | — | — | — |
| Tri(mixed mono-and dinonyl-phenyl) phosphite | 1.0 | 1.0 | 1.0 | 1.0 | 1.0 | 1.0 |
| 4,4'-Thiobis-(3-methyl-6-t-butyl-phenol) | — | 1.0 | — | — | — | — |
| 4,4'-Bis($\alpha,\alpha$-dimethylbenzyl)diphenylamine | — | — | 1.0 | 1.0 | 1.0 | 1.0 |
| Sulfur | 0.15 | — | — | — | — | — |
| Tensile Properties After Press Cure | | | | | | |
| 100% Modulus (psi) | 940 | 500 | 920 | 620 | 610 | 880 |
| Tensile Strength (psi) | 2920 | 2820 | 2860 | 2220 | 2180 | 2880 |
| Elongation at Break (%) | 290 | 300 | 270 | 260 | 320 | 360 |
| Shore A Hardness | 69 | — | 66 | 62 | 66 | 72 |
| % Volume Swell | | | | | | |
| Press Cured Samples | 113 | 105 | 67 | 88 | 37 | 246 |
| Post Cured Samples | 84 | 81 | 58 | 75 | 37 | 152 |
| Brittle Point (°C.) | <−60 | <−60 | −52 | <−60 | −41 | <−60 |

EXAMPLE 6

A random copolymer containing propyl hydrogen maleate can be produced by substituting an equal molar amount of this monomer for the ethyl hydrogen maleate of any of Examples 1-5, and carrying out the reaction under substantially the same conditions. The product will have similar properties.

I claim:

1. A random copolymer made by continuously feeding monomers and initiator to a stirred reaction zone and continuously withdrawing a reaction mixture containing the copolymer from the reaction zone, which copolymer when it contains 50 parts of fast extruding carbon black per 100 parts of copolymer and is cured with 1.5 parts of hexamethylene diamine carbamate per 100 parts of copolymer for 30 minutes at 180°C and 40,000 lbs. pressure has a brittle point of less than about −40°C, an oil swell of less than about 120%, a Shore A hardness at 25°C of less than 69, an elongation at break of greater than 260%, and a 100% modulus of less than 940 psi, comprising polymerized ethylene, alkyl acrylate selected from methyl and ethyl acrylate, and from about 0.5 to 10 weight percent of a mono alkyl ester of 1,4-butene-dioic acid in which the alkyl group of the ester has 1 to 6 carbon atoms, said copolymer having from about 20 to 35 grams of ($-CO_2-$) units per 100 grams of copolymer, said copolymer having a melt index of about 0.3 to 100 g/10 min.

2. A copolymer of claim 1 wherein the alkyl acrylate units consist essentially of methyl acrylate.

3. A copolymer of claim 2 wherein the methyl acrylate units comprise about from 40 to 62% by weight of the copolymer.

4. A copolymer of claim 1 wherein the ester of 1,4-butene-dioic acid is propyl hydrogen maleate.

5. A copolymer of claim 1 wherein the ester of 1,4-butene-dioic acid consists essentially of ethyl hydrogen maleate.

6. A copolymer of claim 1 wherein the ester of 1,4-butene-dioic acid is methyl hydrogen maleate.

* * * * *